Jan. 4, 1955   H. ENSMINGER   2,698,730
FIRE EXTINGUISHER VALVE OPERABLE BY BACK PRESSURE
Filed June 13, 1951   3 Sheets-Sheet 1
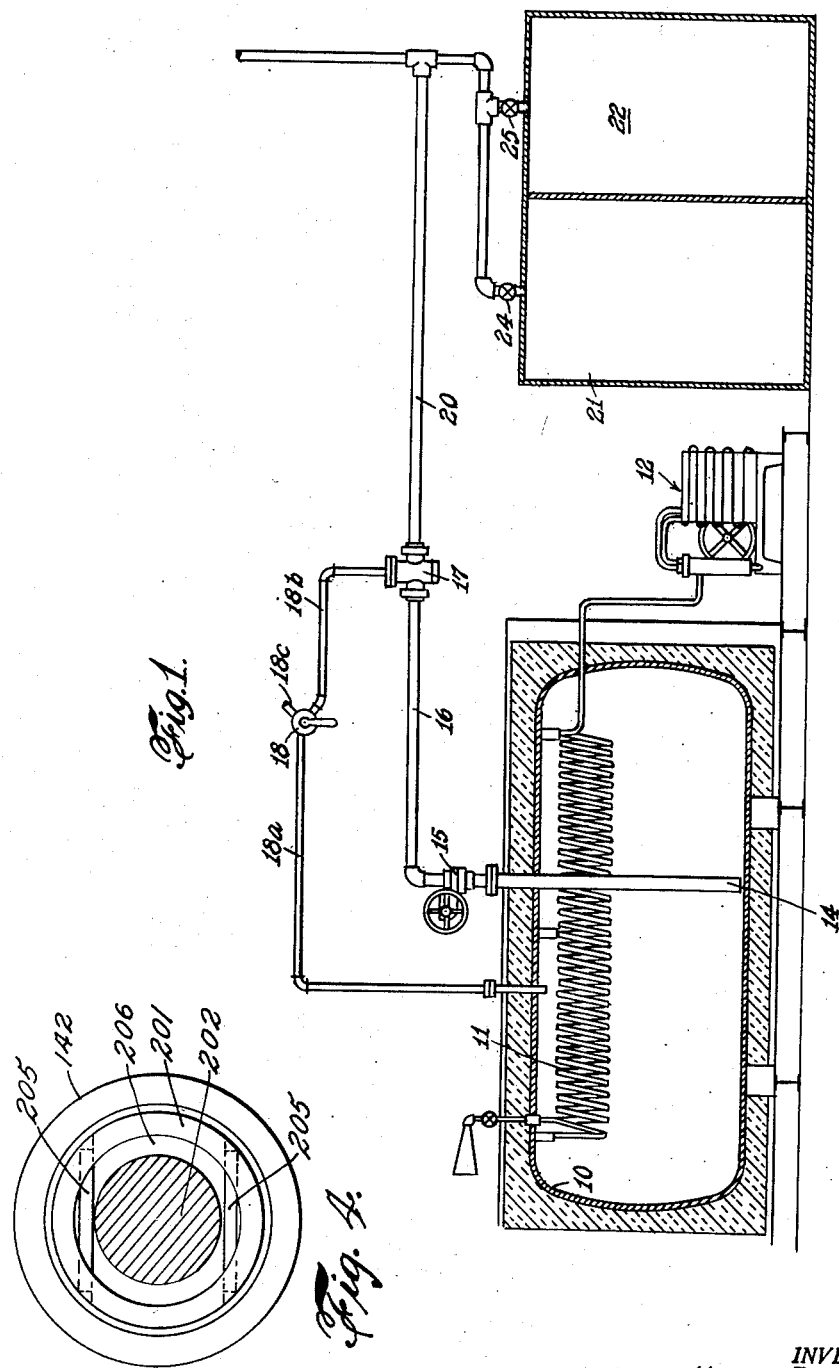
INVENTOR.
HARRY ENSMINGER
BY
Edward P. Connors
ATTORNEY

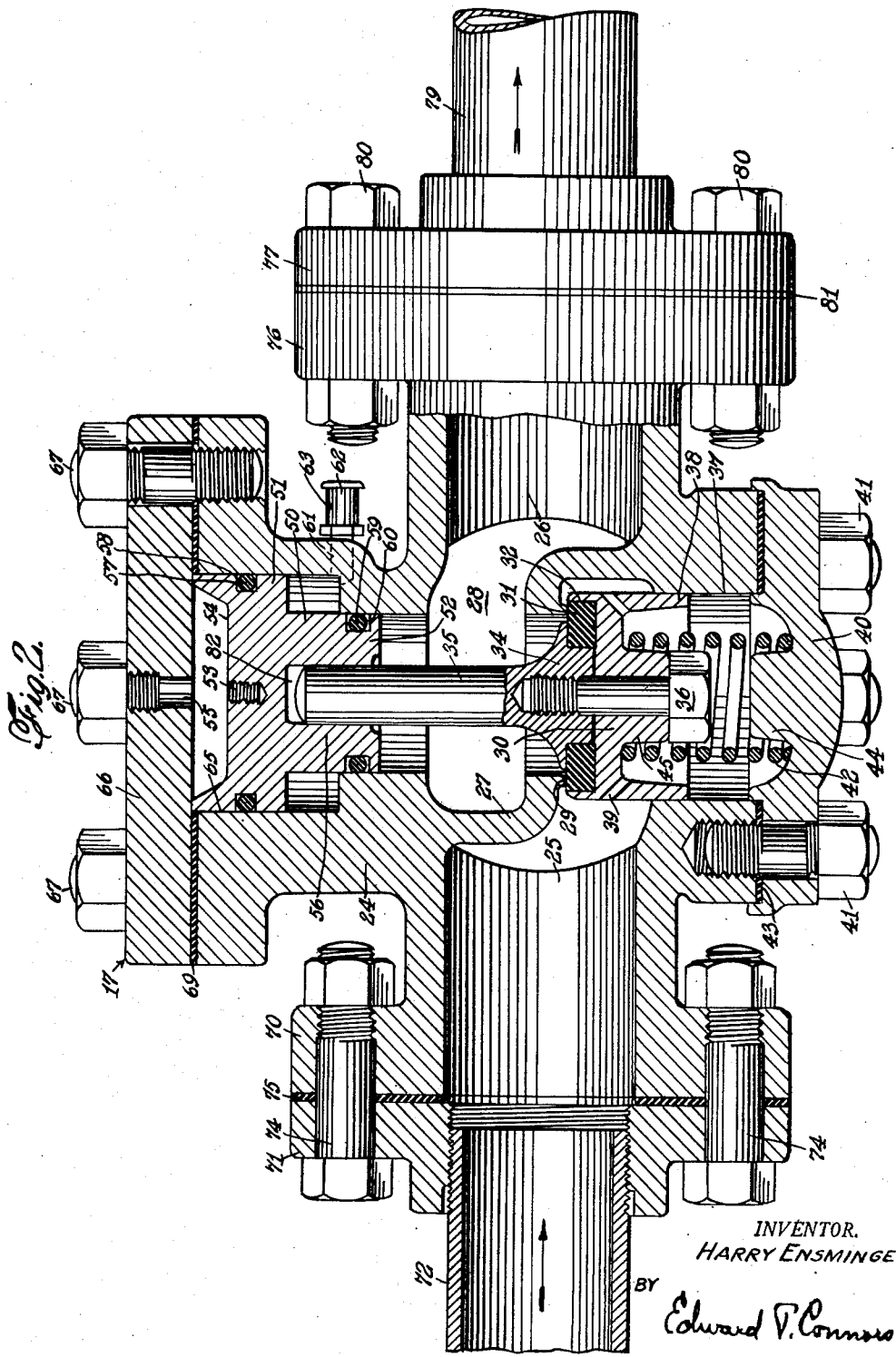

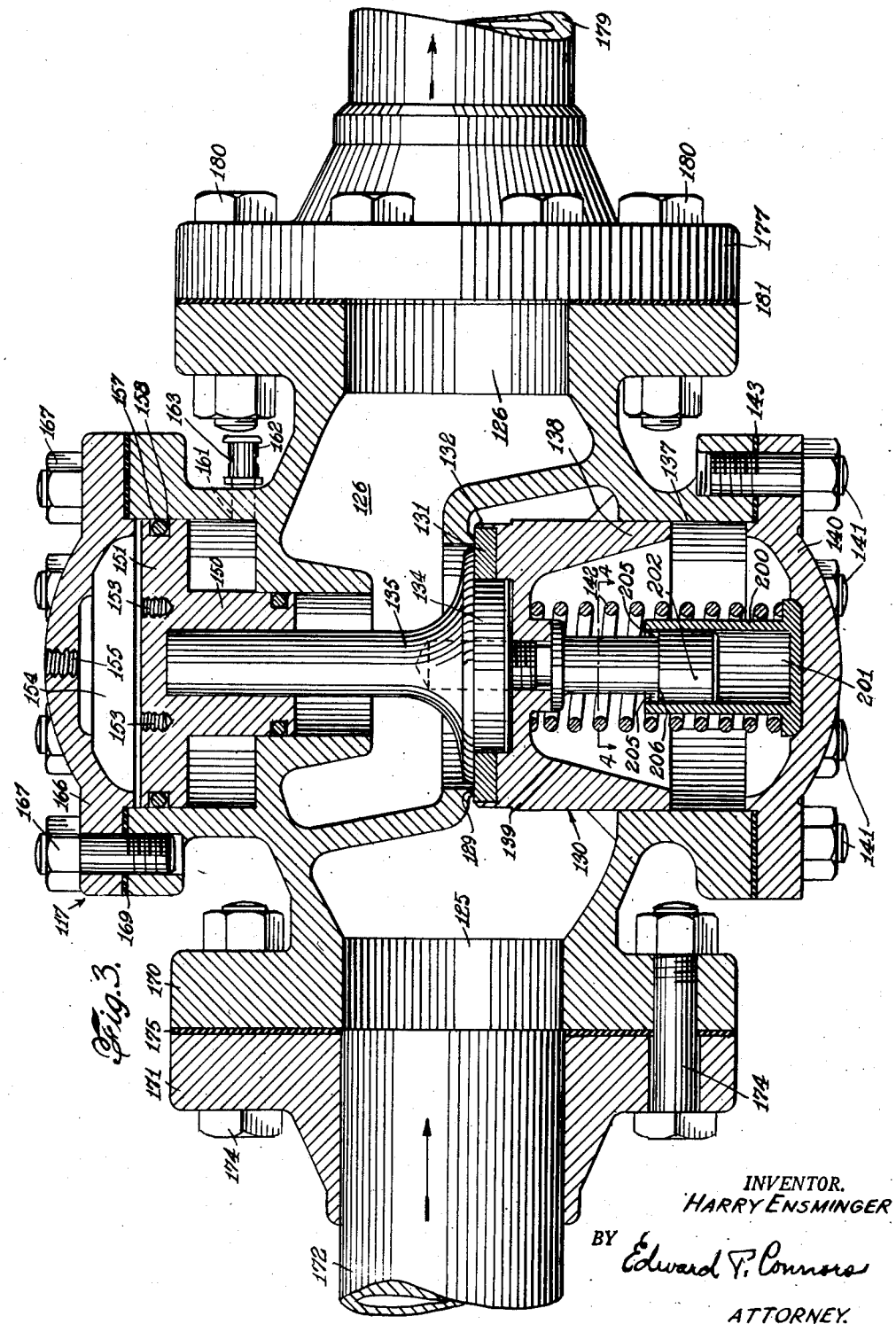

United States Patent Office 2,698,730
Patented Jan. 4, 1955

2,698,730

FIRE EXTINGUISHER VALVE OPERABLE BY BACK PRESSURE

Harry Ensminger, Millburn, N. J., assignor to C-O-Two Fire Equipment Company, Newark, N. J.

Application June 13, 1951, Serial No. 231,389

4 Claims. (Cl. 251—52)

This invention relates to valves, and particularly to a pressure operated valve for a large capacity fire extinguishing system utilizing one or more tons of a low pressure extinguishing agent such as refrigerated carbon dioxide.

In order to provide for a more economical construction a large capacity system is often designed to utilize low temperature or refrigerated carbon dioxide which may be stored at low pressure in light weight containers. A considerable saving in construction cost is thus achieved as the light weight containers are readily fabricated of sheet metal as compared with the costly forged or drawn cylinders necessary to store carbon dioxide at room temperature. In such installations the saving in weight, space and initial cost more than offsets the cost of refrigeration of the carbon dioxide. Furthermore, by reason of its lower temperature, the refrigerated carbon dioxide is somewhat more effective as an extinguishing agent because of its added cooling effect on the fire.

The discharge of the carbon dioxide is generally effected through a pressure operable main valve and a comparatively large distribution pipe to individual sectionalizing valves, and thence through branch pipes to the space to be protected. Difficulty has been had with the main valves in some installations because of "chattering" or "freeze-up." The chattering has been caused by use of a construction for the pressure operable valve depending upon a pressure drop across the valve to hold the valve open or closed, and in which the available pressure has been insufficient to assure positive action of the valve under all conditions. In such installations the pressure to operate the valve has been provided by tapping the main distribution line ahead of the valve to obtain the fluid to pressurize the valve. The valves used are of the type adapted to be unseated by back pressure so that an excessive increase in the distribution line pressure will cause the opening of the valve member to relieve the excessive pressure by permitting fluid to flow back into the storage tank from the distribution line. The increase in pressure in the distribution line is caused by the pressure rise of trapped carbon dioxide, the pressure increase resulting from absorption of heat through the walls of the distribution pipes. In such valves the spring used is such that the valve will be unseated by a back pressure of about thirty-five pounds per square inch. Due to changing conditions resulting from intermittent discharges, or slow rate discharges, the chattering results.

The chattering of the valve not only results in damage to or wear of the sealing surfaces, but also leads to freeze-up, in which the carbon dioxide solidifies and blocks the valve in either the open or closed condition causing an unsatisfactory operation of the system.

The present invention aims to overcome the difficulties and disadvantages of prior constructions by providing a pressure operable valve in which its operation is independent of the pressure drop across the valve thus providing for its positive operation.

Another object of the invention is to provide a valve which is simple and economical in manufacture, efficient in operation and durable in use.

In accordance with the invention the foregoing objects are accomplished by providing a pressure operated valve in which the area exposed to the operating pressure is greater than the area exposed to the line pressure so as to effect a positive operation of the valve. In its preferred form the pressure operated valve is actuated by a piston having its upper surface exposed to the operating pressure and of a larger area than the area of its lower surface exposed to the line pressure.

Other objects and advantages of the invention will be apparent from the following description and from the accompanying drawings which show, by way of examples, embodiments of the invention.

In the drawings:

Figure 1 is a schematic representation of a fire extinguishing system utilizing a low pressure fire extinguishing agent and in which the main valve is in accordance with the invention.

Figure 2 is a vertical sectional view of a valve in accordance with the invention.

Figure 3 is a vertical sectional view of a slightly modified construction in accordance with the invention, and which is particularly suited for use in larger capacity systems.

Figure 4 is a partial horizontal sectional view at an enlarged scale taken along the line of 4—4 of Figure 3.

Referring to the drawings there is shown a fire extinguishing system adapted to utilize a low temperature low pressure extinguishing agent. The system comprises an insulated storage tank 10 having a cooling coil 11 connected with a compressor unit 12 to maintain the stored extinguishing agent at a low temperature and a corresponding low pressure. A discharge pipe 14 extends to the inside of the storage tank 10 terminating adjacent the bottom thereof. The pipe 14 is fitted with a manual shut-off valve 15 connected by a pipe 16 with a pressure actuated valve 17, constructed in accordance with the invention, and which is controlled by a manually-operated control valve 18 supplied from the vapor space of the storage tank 10 by a pilot feed line 18a and connected to the pressure actuated valve 17 by a pilot feed line 18b. A vent line 18c releases pressure from the pressure operated valve 17 when the control valve 18 is in position for the closing of the valve 17. The outlet of the pressure operated valve 17 is connected by a distribution line or pipe 20 to spaces 21 and 22 through selector valves 24 and 25 so that the entire discharge may be delivered alternatively to either of the spaces 21 or 22.

The pressure actuated valve 17, in accordance with the invention, includes a housing 24 having a passage therethrough providing an inlet 25 and an outlet 26. A valve chamber 28 is formed by enlarging the passage at its center portion. An apertured generally "S" shaped partition 27 has a valve seat 29 formed on the under side of the partition 27 about the opening therein and defining inlet and outlet portions of the passage through the valve. A valve member 30 is adapted to engage the valve seat 29, contact therebetween being made through a seating material 31 such as Nylon, Corprene, or any other suitable material for a leak-proof seal. The seating material is confined in a recess 32 and held in position by a flange 34 at the end of a valve operating rod 35. A bolt 36 engaged in a threaded opening in the end of the valve operating rod 35 secures the operating rod 35 to the valve member 30 to hold the seating material in a leak-proof relationship with the walls of the recess 32.

The valve member 30 is held in alignment with its seat 29 by a guideway 37 formed in the housing 24, the valve member 30 having a depending skirt 38 to fit the guideway 37. The alignment of the valve member 30 with its seat 29 is also maintained by a valve stem described hereinafter. A vent 39 is formed in the skirt 38 to prevent compression of fluid behind the valve member. The valve member 30 is inserted from the bottom of the housing 24 through the guideway 37 and is held in position by a cap member 40 secured by bolts 41. A spring 42 is used to hold the valve member 30 normally against its seat. The spring 42 has its ends positioned over opposed projections 44 and 45, the projection 44 being on the inner surface of the cap member 40 and the projection 45 being on the under surface of the valve member 30. The spring 42 is chosen of a compressive strength so that the valve member 30 may be unseated under a back pressure of about thirty-five pounds per square inch. A leak-proof seal is made between the cap member 40 and the housing 24 by a gasket 43.

Pressure operated means are utilized to unseat the valve member 30 including a piston member 50 having an upper piston 51 of greater diameter than its lower piston 52. The top of the upper piston 51 of the piston member 50 is provided with a threaded opening 53 to be engaged by a tool for the insertion and removal of the piston, the top of which is recessed as indicated at 54 to provide an expansion chamber for the actuating fluid medium introduced through the inlet 55. The lower piston 52 of the piston member 50 is recessed as indicated at 56 to slidably receive the upper end of the operating rod 35 in order to assist the guideway 37 in properly aligning the valve member 30 with its seat 29. Leakage is prevented past the piston sides of the upper piston 51 by an O ring gasket 57 in an annular recess 58, and leakage past the lower piston 52 is prevented by an O ring gasket 59 in an annular recess 60. The lower side of the upper piston 51 is vented to atmosphere through an outlet passage 61 having at its outer end a cap member 62 with openings 63. The piston member 50 is reciprocable in a cylinder 65 formed in the upper portion of the housing 24. The end of the cylinder is closed by a cylinder head 66 secured by stud bolts 67 and sealed against leakage by a gasket 69.

The housing 24 about the inlet 25 is made with a flange 70 adapted to be connected to a matching flange 71 of an inlet pipe line 72 by bolts 74, the connection being sealed by a gasket 75. Likewise, the housing 24 about the outlet 26 is made with a flange 76 adapted to be connected to a matching flange 77 of an outlet pipe line 79 by bolts 80, the connection being sealed by a gasket 81.

In the operation of the valve 17, fluid pressure medium is introduced through the inlet 55 from the pilot feed line 18b upon the actuation of the control valve 18 to pressurize the top of the upper piston 51 which acts through the operating rod 35 to unseat the valve member 30. Fluid medium from the inlet 25 then acts on the under side of piston 52 in opposition to the fluid pressure acting on the piston 51. However, by reason of the difference in areas between the two pistons the valve is held in the open position without chance of "chattering" with the resultant possibility of "freeze-up" even though the rate of discharge through the outlet 26 is small. Upon the release of pressure from the piston 51 the piston member 50 is urged upwardly by the pressure on the piston 52 and by the force of the spring 42 acting on the lower side of the valve member 30. The valve member 30 is held closed by the pressure in inlet 25. In the event fluid remains in the outlet 26 by reason of the closure of a valve along the pipe 79 and the fluid is expanded by the absorption of heat an increase in pressure of approximately 35 pounds per square inch over the pressure in the inlet 25 will cause the valve member 30 to be unseated to release the fluid to the inlet supply. By reason of the freely mounted upper end construction for the operating rod 35, the piston member remains stationary during the back flow past the valve member 30.

It should be noted that a small space 82 is left between the upper end of the operating rod 35 and the floor of the recess 56 when the valve is in its normally closed position, the space being provided so that a slight hammer action is given to the operating rod 35 by the downward movement of the piston member 50 so as to overcome any possible sticking between the valve member 30 and its seat 29 such as might possibly occur in the event the valve is not operated over a period of four or five years.

In Figure 3 another embodiment of the invention is illustrated in which corresponding parts are designated by the same reference numerals as in Figure 2 with the addition of 100. Valve 117 differs principally from valve 17 in that means are provided to cushion the downward movement of the valve member so as to prevent possible damage to the housing. The valve 117 is particularly suited for heavy construction such as is required for very high rates of discharge. The cushioning means includes a dashpot 200 having an open-ended cylinder 201 formed therein and adapted to reciprocably receive a piston member 202 which may be formed integrally with, or attached to, the operating rod 135. A close fit is made between the wall of the piston 202 and the wall of the cylinder 201 so that the use of a gasket is unnecessary, the slight amount of leakage past the piston being advantageous.

Another feature of the valve 117 is the means to permit the easy insertion of the cap member 140 to compress the spring 142 which, because of the large weight of the valve member and its piston operating assembly, is necessarily quite stiff and difficult to manipulate. The upper portion of the dashpot cylinder 201 is apertured to receive one or more pins or bolts 205 which abut against a shoulder 206 formed between the junction of the top of the piston 202 and the operating member 135. The spring 142 is compressed and the pins or bolts 205 are inserted in the apertures in the dashpot 201 between convolutions of the spring, the length of the pins or bolts 205 being less than the internal diameter of the spring so that further compression of the spring it not affected thereby. An assembly is thus made of the valve member 130, the spring 142 and the dashpot 201 which may be placed in position and the cap member 140 drawn up by the bolts 141 to compress the spring the desired amount and to make a seal between the cap member 140 and the gasket 143.

It is thus apparent that a "chatterproof" pressure operated valve has been provided which is of inexpensive and rugged construction. While the invention has been described and illustrated with reference to specific embodiments thereof, it will be understood that other embodiments may be resorted to without departing from the invention. Therefore, the form of the invention should be considered as illustrative and not as limiting the scope of the following claims.

I claim:

1. A large capacity main line valve for a fire extinguishing medium stored at a low temperature and corresponding vapor pressure, the valve adapted to be intermittently opened by back pressure of fluid in its outlet for flow from its outlet to its inlet and to be opened by a control fluid pressure for flow from its inlet to its outlet, the valve comprising a housing having a passage extending transversely therethrough, an apertured partition extending across the passage and having its opening transversely positioned with respect to the axis of the passage, the wall of the aperture providing a valve seat, the partition defining inlet and outlet portions of the passage, a valve member adapted to engage the inlet side of the partition to close the passage, a spring urging the valve member against its seat, means in the housing defining a cylinder having its axis located perpendicular to the axis of the passage, the cylinder having an outer portion of one diameter and an inner portion of a lesser diameter, vent means for the inner end of the outer portion of the cylinder, a piston having an outer portion of a diameter to fit the outer portion of the cylinder and an inner portion of a diameter to fit the inner portion of the cylinder, gasket means for each portion of the piston, a downwardly depending skirt for the valve member having approximately the same diameter as the valve member, means forming a valve member guideway in the housing receiving the valve member skirt, the piston having a guideway recess in its lower end of a depth greater than the length of travel of the valve member, and a valve operating rod fixedly engaged with the top of the valve member and slidably extending in the piston guideway recess a distance at least equal to the length of travel of the valve member, whereby the valve member is held in axial alignment with its valve seat on its lower side by engagement of its skirt with the valve member guideway and on its upper side by engagement of its valve operating member in the piston guideway recess for normal operation by the pressure of control fluid against the face of the piston and for intermittent back flow operation independently of movement of the piston by back pressure against the face of the valve member.

2. A valve according to claim 1 in which is included a flanged cover forming an end for the cylinder for access to the piston, and a second flanged cover forming an end for the valve member guideway for access to the valve member.

3. A valve according to claim 1 in which is included dashpot means to cushion the downward movement of the valve member, including a dashpot piston member extending downwardly from the valve member, and dashpot cylinder means for the dashpot piston.

4. A valve according to claim 1 in which is included dashpot means to cushion the downward movement of the valve member, including a dashpot piston member extending downwardly from the valve member, dashpot cylinder means for the dashpot piston, and spring com- (References on following page)

pression means whereby said spring is held partly in compression.

References Cited in the file of this patent

UNITED STATES PATENTS

| | | | |
|---|---|---|---|
| 941,153 | Krichbaum | Nov. 23, | 1909 |
| 1,373,599 | Clark | Apr. 5, | 1921 |
| 1,406,026 | Jensenius | Feb. 7, | 1922 |
| 1,581,546 | Ranson | Apr. 20, | 1926 |
| 2,010,129 | Baker | Aug. 6, | 1935 |
| 2,115,383 | Christensen | Apr. 26, | 1938 |
| 2,373,654 | Beekley | Apr. 17, | 1945 |
| 2,555,483 | Grant | June 5, | 1951 |
| 2,624,365 | Hesson | Jan. 6, | 1953 |